United States Patent
Hoyt

[15] 3,660,195
[45] May 2, 1972

[54] METHOD AND APPARATUS FOR FORMING CELLULAR CORES

[72] Inventor: Edwin R. Hoyt, Coral Gables, Fla.
[73] Assignee: Core Cell Corporation, Bayamon, P.R.
[22] Filed: June 2, 1969
[21] Appl. No.: 829,167

[52] U.S. Cl..............................................156/197
[51] Int. Cl..............................................B31d 3/02
[58] Field of Search..........................156/197, 256

[56] References Cited

UNITED STATES PATENTS

| | | | |
|---|---|---|---|
| 3,220,906 | 11/1965 | Lincoln | 156/197 |
| 3,257,253 | 6/1966 | Hoyt | 156/256 |

FOREIGN PATENTS OR APPLICATIONS

| | | | |
|---|---|---|---|
| 909,444 | 10/1962 | Great Britain | 156/197 |

Primary Examiner—Benjamin A. Borchelt
Assistant Examiner—G. E. Montone
Attorney—Robert W. Fiddler

[57] ABSTRACT

A method and apparatus for forming cellular cores from sheet stock of paper, metal or plastic for use in the subsequent formation of laminated cellular panels, or for use independently to provide sound and thermal insulation. The process comprises the steps of feeding two or more webs of sheet material to be formed into the core; joining the webs by applying spaced lines of adhesive or the like between the webs along their direction of feed, bringing the webs into contact so as to cause them to join along said first applied lines of adhesive; applying spaced lines of adhesive or the like, spaced to lie between the previously applied adhesive lines on an outer face of the joined webs; simultaneously cutting a group-strip equal in length as measured along the web to the thickness of two or more layers of the final core product from the adhered webs transverse to their direction of movement; and packing and simultaneously cutting said group-strip into two or more strips by moving them transverse to the direction of web feed to simultaneously form a plurality of layers of cellular cores of selected thickness. Apparatus suitable for performing the method is provided comprising supports for two or more supply rolls of web sheet material; means for feeding the sheet material from the supply rolls; sheet joining means such as adhesive applicators and laminating rolls arranged in the path of web feed for applying spaced lines of adhesive between the web surfaces; a final adhesive applicator for providing adhesive on the outer surface of one of said webs; pressure applying means for bringing two or more of the adhesive stripped web surfaces into contact to bond same along the first lines of adhesive application; cutting means for cutting group-strips equal in length as measured in the direction of web feed to the thickness of two or more layers of the cellular core product from the advancing web transverse to the direction of movement; and packing-cutting means for simultaneously packing the group-strips against the strips of previously cut group-strips and cutting the group-strips into a plurality of separate strips equal in length as measured along the web to the thickness of the cellular core product, said packing means packing two or more tiers of strips simultaneously.

16 Claims, 4 Drawing Figures

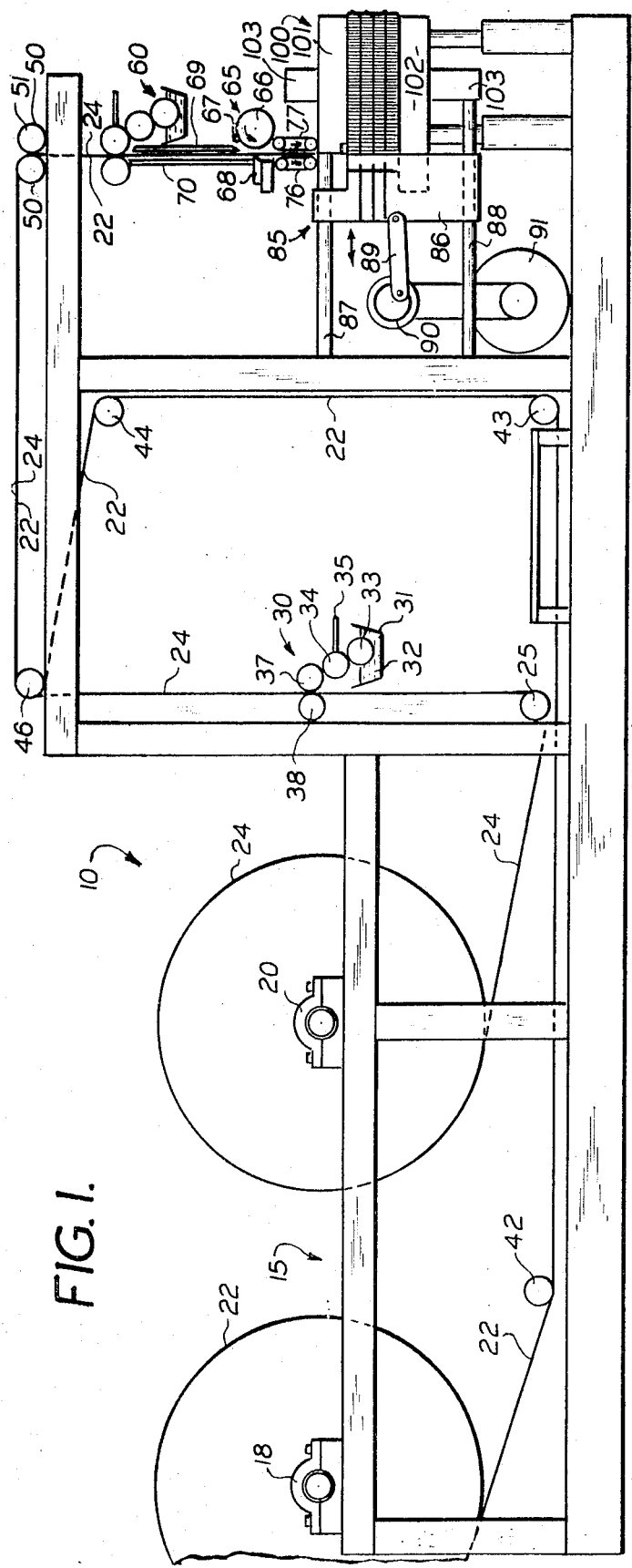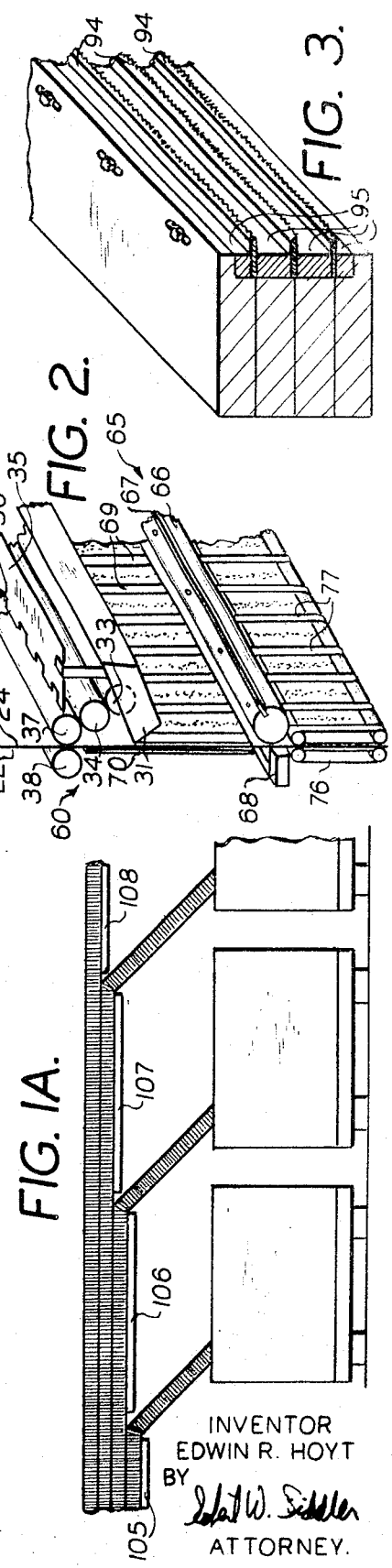

METHOD AND APPARATUS FOR FORMING CELLULAR CORES

BACKGROUND OF THE INVENTION

This invention relates to the art of cellular cores, and more particularly to an improved method and apparatus for forming cellular cores commonly referred to as "honeycomb." The improved method and apparatus permits the simultaneous formation of a plurality of honeycomb layers of the same or different selected thicknesses.

Cellular cores have been widely used in forming a variety of constructional materials, to provide a lightweight relatively strong thermally, acoustically, and if desired electrically insulated structure. These cellular cores are thus employed sandwiched between outer surface skins formed of sheet metal, or the like to provide a relatively lightweight soundproof, and thermally insulated member which may be used in forming walls, or the like building components, for equipment housings, for pallets, or for any of a myriad of structural components.

Such cellular cores may be formed of sheet material of paper, sheet metals, foils, sheet plastics or the like. Applicant in his prior patent U.S. Pat. No. 3,257,253 discloses apparatus for forming such cores of paper by training two or more webs of sheet paper stock to be formed into the cellular cores to pass adjacent adhesive applicators so that a plurality of spaced adhesive lines are applied to one of the surfaces of one of the webs, which surface is then brought into contact with a surface of another web to join the two webs together along the spaced lines of adhesive. Additionally a plurality of spaced lines of adhesive is applied to an outer surface of the joined webs intermediate the lines of application of the first lines of adhesive. Thereafter a strip of the adhesively joined webs is cut from the advancing joined webs and stacked with a subsequently cut strip forced against a previously cut strip of the joined webs so as to bring the second lines of adhesive on the outer surface of the second strip against an outer surface of the first strip to join them together. Thus a continuous layer of strips of material joined along alternately staggered spaced adhesive lines is provided, and when this layer is drawn out an expanded cellular construction is provided, as disclosed in applicant's above noted prior patent U.S. Pat. No. 3,257,253.

As with all production equipment, it is desirable that the equipment function to produce a maximum quantity of the product in any given time. One of the problems in the prior art equipment as exemplified by the apparatus disclosed in applicant's aforementioned patent is that a single layer of cellular honeycomb material is produced at the output end of the equipment. Though production is continuous, the rate of production is limited, and it is found that the subsequent expansion of the formed core does not occupy the full time of the operator's handling the core after production on the equipment.

Additionally, where it is desired to have different thicknesses of honeycomb available, it is necessary to readjust the cutters requiring separate production runs and down time between each production run, increasing the cost of production.

SUMMARY OF THE INVENTION

It is with the above considerations in mind, that the present improved honeycomb forming method and apparatus has been evolved serving to permit the simultaneous continuous formation of a plurality of sheets of honeycomb material of selectively variable thickness.

Accordingly it is among the primary objects of the invention to provide honeycomb forming method and apparatus permitting the simultaneous formation of a plurality of sheets of honeycomb, thus insuring the fact that the machine operators will have their full time occupied.

Another object of the invention is to provide an improved honeycomb forming method and apparatus increasing the efficiency of honeycomb production by providing for simultaneous production of different selected thicknesses of honeycomb.

These and other objects of the invention which will become hereafter apparent are achieved in accordance with the novel method of this invention by feeding two or more webs of sheet material of the type which it is desired to form into the honeycomb core along a desired production path; and joining the webs of sheet material as they are being fed by applying spaced lines of adhesive between the webs along their direction of feed, and bringing the webs into contact to join them along the spaced adhesive lines, and applying a second set of spaced lines of adhesive arranged between the previously applied adhesive lines on an outer face of the joined webs. Thereafter a group-strip is cut from the adhered first and second webs of material transverse to the direction of web feed, said group-strip equal in length as measured along the web to the thickness of two or more layers of core material to be formed. This group-strip is then cut into strips of a length equal to the thickness of the desired core layers and simultaneously packed against previously cut group-strips so that the final line of adhesive of the cut group-strips contact the rear face of the previously cut strips, to join the cut groups of strips. In packing the group-strips together, they are simultaneously cut and separated so that dependent on the number of strips in the group, a corresponding number of sheets or layers of honeycomb will be formed.

A novel apparatus is provided for performing the above method employing supports for two or more supply rolls of webs of sheet material, and web guiding rolls for feeding the sheet material adjacent adhesive applicators which apply the first series of spaced lines of adhesive to one side of one of the webs which is thereafter brought against the face of the other web over laminating rolls to adhere said webs. A final group of adhesive lines is applied on the outer face of the joined webs spaced between the first row of adhesive lines. Thereafter positioned in the path of the laminated first and second webs is a sheet cutter in the form of a rotary knife cutting a group-strip from the web. Sheet feed lines engage the group-strip moving it from the cutter at a linear speed greater than that of web feed to a packing-cutting zone where a reciprocating packer bar with die cutting blades simultaneously cuts the group-strip into strips equal in length to the thicknesses of the layers of core material to be formed and packs the cut strips against the previously cut strips of a previous group-strip to adhere the strips into the desired core layers.

BRIEF DESCRIPTION OF THE DRAWING

The specific details of a preferred embodiment of the invention and their mode of functioning will be particularly pointed out in clear, concise, and exact terms in conjunction with the accompanying drawing wherein:

FIG. 1 is a schematic elevational view showing the apparatus employed for forming the cellular core material;

FIG. 1A is a schematic elevational view of the discharge end of the apparatus of FIG. 1;

FIG. 2 is an enlarged perspective view of the packing die cutter; and

FIG. 3 is an enlarged perspective detail view of the blade supporting portion of the cross-head beam of the die-cutter packer.

DESCRIPTION OF PREFERRED EMBODIMENT OF THE INVENTION

Referring now more particularly to the drawing, like numerals will be employed to designate like parts in the various figures.

The honeycomb forming apparatus 10 is seen to comprise a web roll support stand 15 having bearing blocks 18 and 20 for rotatably supporting rolls of a first and second web of sheet material 24 and 22 respectively. As will be understood by those skilled in the art, a variety of different types of roll stands may be employed for supporting rolls of sheet material to be fed.

The sheet material which may be used in conjunction with the heredisclosed apparatus 10 for forming desired honeycomb may be kraft paperboard, aluminum foil, steel foil, fiber glass, felted cotton webbing, asbestos board, or anyone of a wide variety of sheet materials. Applicant has successfully processed webs of sheet material 6 feet in width, with a stock thickness of between 0.001 inches and 0.03 inches.

The first web of sheet material 24 (the one to the right in the drawing) is trained under threading roll 25, whence it is guided upwardly to adhesive applicator 30 which applies a first set of spaced lines of adhesive to one face of the web 24 (the web face to the right in FIG. 1). The glue applicator 30 may take a variety of forms, such for example as shown in FIG. 4 of applicant's prior patent U.S. Pat. No. 3,257,253, but is preferably as schematically shown in FIGS. 1 and 2 as comprising a liquid adhesive chamber 31 containing an adhesive 32. The adhesive 32 may be anyone of a variety of adhesives, suitable for the material being processed. Polyvinyl acetates, epoxies, hot melts and the like have been found suitable.

An adhesive pickup roll 33 is arranged to dip into the adhesive 32 as a result of which the surface of pickup roll 33 will be coated with the adhesive. Pickup roll 33 rotates in contact with adhesive transfer roll 34 and coats this transfer roll 34 with adhesive. In order to form desired strips of adhesive, doctor blade 35 having notches 36 spaced to correspond to the desired spacing between the lines of adhesive wipes the surface of roll 34. Applicator roll 37 is arranged to contact the web. If desired the doctor blade 35 may be arranged to wipe the applicator roll. As will be understood the adhesive remaining on the roll after wiping by the doctor blade is applied to the web surface contacted by the applicator roll 37. Backing roll 38 serves to insure the training of the web 24 adjacent the adhesive applicator roll 37 as can be seen in the drawing.

Second web 22 (coming from the roll to the left in the drawing) moves under guide roll 42, and over guide rolls 43 and 44 to laminating roll 46. As will be observed from the drawings, at laminating roll 46, second web 22 comes into contact with first web 24 along the surface of web 24 to which the spaced lines of adhesive have been applied by the adhesive applicator 30.

From the laminating roll 46 the combined webs 22–24 are fed to nip rolls 50 and 51, between which the joined web 22–24 passes to second glue applicator 60 which may be substantially identical to first glue applicator 30, as above described. The doctor blade on this second glue applicator 60, is shown as applied to the applicator roll, and the notches are spaced apart a distance equal to the spacing between the notches 36 on glue applicator 30, are staggered with respect to the first notch arrangement so that the lines of glue applied by the second glue applicator lie intermediate the lines of glue applied by the first applicator, as described and illustrated in applicant's prior patent U.S. Pat. No. 3,257,253.

Arranged in the path of travel of webs 22–24 as they leave the second glue applicator 60 are sheet cutting means 65 illustratively shown as in the form of a rotary sheet cutter having cylinder 66 on which is mounted cutter blade 67 arranged to move against anvil 68. Web guides 69 and 70 are positioned between second adhesive applicator 60 and the rotary sheet cutter 65 to insure proper guiding of the laminated web 22–24 to the rotary cutter 65. Web guide 70 may be a solid plate, while guide 69 is formed preferably by spaced strips lying between the adhesive lines.

The strip cut by cutting means 65 is herein referred to as a "group-strip" indicating that the length of the group-strip as measured along the web is equal to the thickness of two or more layers of the core material to be formed.

Downstream of rotary cutter 65, and positioned to receive the group-strips of laminated sheeting 22–25 separated from the web by the action of cutter knife 67 is driven strip sheet feed assembly 75, which in the illustrated embodiment is schematically shown as comprised by endless groups of feed lines 76 and 77 in the form of loops mounted over pulleys so that the feed lines 76 and 77 sandwich and guide the laminated web 22–24. As will be understood by those skilled in the art, the feed lines 76 and 77 comprise a plurality of spaced endless loops arranged on rollers as schematically shown with the loops positioned to lie between the adhesive lines on the advancing strip. The intake end of the sheet feed lines is positioned with respect to the line of feed of the web so as to engage the leading edge of the strip cut from the web by sheet cutter blade 67. In a preferred arrangement, the arrangement of the strip feeder should be carefully oriented with respect to the cutting roll 66 so that the leading edge of the cut strip is engaged by the infeed end of the strip feeder immediately upon cutting, and the surface speed of the strip feeders should be greater than the linear speed of the sheet cutting knife 67, for a purpose to become hereinafter more apparent.

A die cutting and packing assembly 85 is provided downstream of the sheet feeder 75 to receive the group-strip cut from laminated web 22–24. The die cutter and packing assembly 85 is an improved variation of the strip cutter and packing apparatus shown in applicant's prior patent U.S. Pat. No. 3,307,440, and comprises a reciprocably mounted blade supporting cross-head beam 86. The blade supporting reciprocable cross-head beam 86 is mounted for reciprocation on guide rails 87 and 88, and reciprocated by connecting rod 89 connected to crank 90 driven by motor 91, as schematically illustrated. One or more die cutting knives 94 is held between spacers 95 in the reciprocating block 86 extending into the path of movement of the strip coming from strip feeder 75, with the number of knives selected depending on the number of strips to be cut from the group-strip which has already been cut by rotary cutter 65. In the illustrated embodiment, three cutter blades 94 are shown positioned between spacer blocks 95. As will be apparent to those skilled in the art, the thickness of the spacer blocks, may be varied selectively to provide for different blade spacing, as a result of which the strip will be cut into different thicknesses.

Packing chamber 100 is formed by an upper packing plate 101, and a lower packing plate 102, which packing plates 101 and 102 are preferably mounted to permit vibration thereof as by vibrators 103, so as to implement desired flow of the cut groups of strips there between.

At the outlet end of the packing chamber 100, it is preferred to provide two or more discharge tables (four of which are here shown) 105, 106, 107 and 108, each table aligned with one of the sheets of honeycomb produced by the packing of the strips into the packing chamber 100.

OPERATION

In use, the aforedescribed apparatus may be employed in practicing methods of this invention. It will however be apparent to those skilled in the art that a wide variety of variation in apparatus may be utilized to perform the disclosed steps.

According to the method of the invention, two or more webs of sheet material to be fabricated into the core are fed along a flow path leading to a packing-cutting zone. One of the sheets of material, on the face thereof facing the other sheet of material is provided with a plurality of spaced lines of adhesive, and the two sheets are laminated together along these spaced lines of adhesive by bringing them into contact as they move along the webs' flow path. Thereafter a second group of spaced lines of adhesive is applied to the external surface of one of the sheets, with the second group of spaced lines of adhesive being staggered to lie between the first lines of adhesive. Group-strips of the laminated sheet material are cut from the web advancing along the webs' flow path, with the length of the cut group-strip as measured along its direction of feed totaling the thickness of two or more layers of honeycomb to be formed. After cutting of this group-strip, the group-strip is fed along the web flow path at a speed greater than the speed of the web prior to cutting, and advancing to a position where two or more strips are cut from this group-strip, with the resulting group of strips simultaneously packed against a previously cut group of strips so as to cause the second lines of adhesive to join the last cut group of strips with the previously cut group of strips.

The schematically illustrated apparatus here presented as suitable for practicing the method of the invention is used by positioning rolls of webs of desired sheet material on the roll stand 15. The web from each roll is trained along the flow path illustrated in FIG. 1, with the first web (to the right in the drawing) moving adjacent adhesive applicator 30, which as above described, applies a series of spaced lines of adhesive to the face of web 24 facing web 22.

Web 22 coming from the roll to the left in the drawing meets up with the adhesive stripped face of web 24 at laminating roll 46, where the webs 22 and 24 are laminated together, and fed to nip rolls 50, 51. According to the illustrated preferred embodiment of the invention, it is found that desired power for movement of the webs can be obtained merely by driving nip rolls 50, 51, with all of the previously described rolls being friction driven. Selected drives may however be employed should such be found desirable depending on the weight of the stock being processed, the rate of speed, and any of a variety of mechanical factors normally providing criteria for determining whether feeding rolls are driven or idle. In operating with 6 foot wide sheet stock of a thickness less than 0.03 inches, a satisfactory rate of speed of 50 feet per minute for the laminated webs 22–24 is found to produce satisfactory results.

The laminated web 22–24 is fed through second adhesive applicator 60, which as above described provides a series of spaced lines of adhesive, with the spacing between the lines of adhesive equal to the spacing between the first lines of adhesive, but being staggered to lie between them, on an outer face of web 24.

The externally adhesive stripped laminated web 22–24 is then fed at 50 feet per minute to the cutting station, at which the speed of cutting roll 66 is regulated depending on the total of the thickness of the honeycomb layers to be produced simultaneously. Thus if four 1 ½ inch thickness of honeycomb are to be produced at the same time, it will be necessary to cut a six inch strip from the advancing web, and a cutting roll rotating at 100 r.p.m. with a single cutter blade 67 will cut off such 6 inch strips. The radius of the cutting roll 66, and the positioning of the intake rolls of the strip feeder 75 are such that the leading edge of the cut off strip is gripped simultaneously as it is cut. The linear speed of the group-strip feeders 75 is selected to be greater than the initial web feed speed, and is selected to be co-ordinated with the rate of reciprocation of the packing die cutting assembly 85, with the length of the path of the strip feeder being such as to insure the fact that no advancing group-strip interfered with the reciprocation of the packer. With a packer head 86 reciprocating at 400 strokes per minute, the strip feeder 75 should feed the cut strip of a 6 inch length at 200 feet per minute. Lesser or greater speeds may obviously be employed, the only consideration required being that the speed of the strip feeder, and the speed of reciprocation of the packer be co-ordinated, with the speed of the strip feeder being greater than the speed of web feed to the cutter 65 so as to provide some short time interval during which there is no material flow to the packer as it is reciprocating.

It will be seen from the foregoing, that knife positioning in the packer die cutter 86 may be selected to provide simultaneous cutting of different thicknesses of honeycomb, and continuous production can be obtained of a plurality of like or different thicknesses of honeycomb.

What is claimed is:

1. Honeycomb forming means comprising sheet feeding means feeding a plurality of webs of sheet material toward a packing-cutting zone; attaching means along the line of feed of the webs of sheet material securing adjacent webs together along spaced lines extending along the direction of web feed; an applicator applying spaced lines of attaching means to an outer surface of the attached webs; cutting means in the path of travel of the attached webs severing a group-strip from the attached webs equal in length as measured in the direction of web feed to the thickness of a plurality of layers of the honeycomb to be formed; strip advancing means engaging the group-strip and advancing it toward the packing-cutting zone at a rate faster than the rate of feed of the webs to said cutting means; and packing-cutting means receiving the group-strip advanced by said strip advancing means, engaging said group-strip to pack and simultaneously cut said group-strip into a plurality of separate strips each equal in length as measured along the direction of web feed to the thickness of a layer of the honeycomb to be formed.

2. Honeycomb forming means as in claim 1 in which said attaching means comprise an adhesive applicator having: an adhesive chamber; an adhesive pickup roll mounted to rotate with at least a portion thereof dipping into the adhesive in said chamber; an adhesive transfer roll contacting said pickup roll; an applicator roll contacting said pickup roll and the face of one of the webs facing another web as the webs are fed; and a doctor blade above said chamber wiping the adhesive transferred from said pickup roll to only permit the application of spaced lines of adhesive to the web contacted by said applicator roll.

3. Honeycomb forming means as in claim 2 in which said attaching means includes a laminating roll downstream of said attaching means along the path of travel of the webs over which the webs are trained after application of adhesive to the face of one of the webs to bring the adhesive stripped surface of one web against another web, said laminating roll being above said applicator, whereby any excess adhesive squeezed out by the passage of the webs over said laminating roll will drain down along the surfaces of the web.

4. Honeycomb forming means as in claim 1 in which said applicator comprises an adhesive applicator applying spaced lines of adhesive to said outer surface of the attached webs.

5. Honeycomb forming means as in claim 4 in which said applicator comprises an applicator roll contacting said outer web surface; and a doctor blade having a roll wiping edge with a series of spaced notches, the unnotched edge portions of the blade contacting the surface of said applicator roll to remove adhesive from said roll except at the notched portions of the blade.

6. Honeycomb forming means as in claim 1 in which said cutting means comprise a rotary cutter comprising a roll rotating about an axis transverse to the direction of web feed; and a cutter blade on said roll intercepting the web to cut a group-strip from said web on every rotation of said roll.

7. Honeycomb forming means as in claim 1 in which said strip advancing means comprise a plurality of endless feed lines trained over opposed pairs of pulleys, with the group-strip sandwiched between the feed lines, said feed lines spaced to lie between the spaced lines of attaching means applied to the outer surface of the group-strip.

8. Honeycomb forming means as in claim 1 in which said packing-cutting means comprise: a reciprocably mounted cross-head beam moving to traverse the path of feed of the group-strips from said strip advancing means; and a plurality of die cutting blades in said head spaced apart a distance equal to the thickness of the desired layers of honeycomb to be formed.

9. Honeycomb forming means as in claim 8 in which a packing chamber is arranged in the path of said reciprocating cross-head beam into which the cut group strip is forced by the reciprocating cross-head, said packing chamber comprising an upper and lower wall spaced apart a distance equal to the thickness of the plurality of layers of honeycomb formed from the group-strip.

10. Honeycomb forming means as in claim 9 having vibrating means coupled to at least one of said packing chamber walls.

11. Honeycomb forming means as in claim 9 having a plurality of discharge tables at the outlet end of said packing chamber, one table of said plurality aligned to support one of the layers of honeycomb being simultaneously formed in said chamber.

12. In a honeycomb forming machine in which webs of sheet stock attached along spaced lines are fed to a packing-cutting zone, a packer-cutter in the packing-cutting zone comprising: a reciprocating cross-beam reciprocating across the path of web feed; and a plurality of die cutting knives in said cross-head extending from the leading face thereof, said knives spaced apart with a distance therebetween equal to the thickness of a layer of honeycomb to be formed, the number of knives being such as to cut at least two strips to form at least two layers of honeycomb simultaneously.

13. In a honeycomb forming machine as in claim 12, a packing chamber in the path of reciprocation of said cross-beam, said chamber comprising: an upper and lower wall spaced apart a distance equal to the thickness of the plurality of layers of honeycomb being formed.

14. A method of forming honeycomb comprising the steps of feeding a plurality of webs of sheet material toward a packing-cutting zone; attaching said fed webs to each other along spaced lines extending along the direction of web feed; applying attaching means to an outer surface of the attached webs along spaced lines lying between the lines of attachment of the attached webs; and simultaneously cutting a plurality of strips of the attached webs, each strip equal in length as measured along the web to the thickness of a layer of honeycomb to be formed, and while cutting the plurality packing the cut strips against a plurality of previously cut strips.

15. A method as in claim 14 in which the plurality of cut strips are confined to resist the force of packing the subsequently cut strips.

16. A method of forming honeycomb comprising the steps of:
continuously feeding contacting webs of sheet stock of which the honeycomb is to be formed toward a packing-cutting zone, said webs being adhered together along spaced first lines parallel to the direction of web feed, and one of the outer faces of said contacting webs having second lines of adhesive parallel to and between said first lines;

cutting group-strips transversely from said contacting webs as they are fed to the packing-cutting zone, in advance of the packing-cutting zone, each group-strip being equal in length as measured along the web to at least two of the thicknesses of the layers of honeycomb to be formed;

advancing the cut group-strip after it is cut at a faster rate of speed than the speed of web feed to the packing-cutting zone;

packing and simultaneously cutting the group-strip at the packing-cutting zone by forming and simultaneously cutting the group-strip against previously packed and cut group-strips to simultaneously form two or more layers of honeycomb.

* * * * *